United States Patent
Moon et al.

(10) Patent No.: US 11,343,765 B2
(45) Date of Patent: May 24, 2022

(54) COMMUNICATION MODULE IN VEHICLE AND CONTROL MESSAGE GENERATING METHOD THEREFOR

(71) Applicant: LG INNOTEK CO., LTD., Seoul (KR)

(72) Inventors: Jung Sik Moon, Seoul (KR); Jeong Gil Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 854 days.

(21) Appl. No.: 16/071,409

(22) PCT Filed: Dec. 12, 2016

(86) PCT No.: PCT/KR2016/014539
§ 371 (c)(1),
(2) Date: Jul. 19, 2018

(87) PCT Pub. No.: WO2017/126807
PCT Pub. Date: Jul. 27, 2017

(65) Prior Publication Data
US 2021/0204210 A1    Jul. 1, 2021

(30) Foreign Application Priority Data
Jan. 20, 2016    (KR) .......................... 10-2016-0007087

(51) Int. Cl.
*H04W 52/02*    (2009.01)
*H04W 76/30*    (2018.01)
*H04W 52/40*    (2009.01)

(52) U.S. Cl.
CPC ... *H04W 52/0216* (2013.01); *H04W 52/0277* (2013.01); *H04W 52/40* (2013.01); *H04W 76/30* (2018.02)

(58) Field of Classification Search
CPC ......... H04W 52/0277; H04W 52/0216; H04W 52/40; H04W 76/30; H04W 52/0261; H04W 52/02; Y02D 30/70
See application file for complete search history.

(56) References Cited

U.S. PATENT DOCUMENTS 6,957,091 B1 * 10/2005 Ptasinski ............ G01R 31/3832
455/572
7,714,707 B2 * 5/2010 Juzswik .............. B60C 23/0408
340/447

(Continued)

FOREIGN PATENT DOCUMENTS

| KR | 10-2002-0012011 A | 2/2002 |
| KR | 10-2006-0063592 A | 6/2006 |

(Continued)

*Primary Examiner* — Robert C Scheibel
(74) *Attorney, Agent, or Firm* — Birch, Stewart, Kolasch & Birch, LLP

(57) ABSTRACT

A communication module in a vehicle according to an embodiment of the present invention comprises: a battery unit; a receiving unit for receiving power from the battery unit and operating by a predetermined period in a reception standby state; and a control unit configured to accumulatively calculate an amount of current consumed according to an operation time of the receiving unit, and generate a control message for controlling a turn-off of the communication module or controlling an operation period of the receiving unit when the accumulatively calculated value exceeds a predetermined value.

19 Claims, 4 Drawing Sheets

(56) References Cited

U.S. PATENT DOCUMENTS

| | | | | |
|---|---|---|---|---|
| 8,670,897 B1* | 3/2014 | Ralson | ............... | G06F 11/3013 |
| | | | | 701/36 |
| 2004/0127206 A1* | 7/2004 | Van Bosch | ....... | H04W 52/0216 |
| | | | | 455/418 |
| 2004/0127265 A1* | 7/2004 | Van Bosch | ....... | H04W 52/0261 |
| | | | | 455/574 |
| 2009/0088910 A1* | 4/2009 | Yi | .......................... | H04L 67/12 |
| | | | | 701/1 |
| 2014/0128021 A1* | 5/2014 | Walker | ............. | H04W 52/0277 |
| | | | | 455/405 |

FOREIGN PATENT DOCUMENTS

| | | |
|---|---|---|
| KR | 10-2007-0006139 A | 1/2007 |
| KR | 10-2013-0002661 A | 1/2013 |
| KR | 10-2015-0044201 A | 4/2015 |
| WO | WO 01/08439 A1 | 2/2001 |

* cited by examiner

FIG. 5

```
rx_on
rx_off(time = 21), cnt = 295
rx_on
rx_off(time = 18), cnt = 333
rx_on
rx_off(time = 18), cnt = 370
rx_on
rx_off(time = 18), cnt = 407
rx_on
rx_off(time = 18), cnt = 444
rx_on
rx_off(time = 18), cnt = 499
rx_on
rx_off(time = 18), cnt = 536
rx_on
rx_off(time = 18), cnt = 573
rx_on
   [96:count]   lte_tx_on
   [96:count]   lte_tx_off(time = 174), add_cnt = 709
rx_off(time = 2256), cnt = 4292
rx_on
rx_off(time = 41), cnt = 4342
rx_on
rx_off(time = 20), cnt = 4379
rx_on
rx_off(time = 16), cnt = 4416
rx_on
rx_off(time = 16), cnt = 4453
rx_on
rx_off(time = 16), cnt = 4508
rx_on
rx_off(time = 5), cnt = 4538
rx_on
rx_off(time = 5), cnt = 4568
rx_on
rx_off(time = 5), cnt = 4598
rx_on
rx_off(time = 5), cnt = 4646
```

COMMUNICATION MODULE IN VEHICLE AND CONTROL MESSAGE GENERATING METHOD THEREFOR

CROSS REFERENCE TO RELATED APPLICATIONS

This application is the National Phase of PCT International Application No. PCT/KR2016/014539, filed on Dec. 12, 2016, which claims priority under 35 U.S.C. 119(a) to Patent Application No. 10-2016-0007087, filed in the Republic of Korea on Jan. 20, 2016, all of which are hereby expressly incorporated by reference into the present application.

TECHNICAL FIELD

The present invention relates to a telematics device, and more specifically, to a communication modem included in a telematics device.

BACKGROUND ART

A telematics device mounted in a vehicle communicates with a remote telematics server. Using the communication allows a driver to remotely diagnose the vehicle, remotely control the vehicle, use traffic information received from the remote telematics server, or transmit a remote request to the telematics server.

With developments in the telematics technology, there has been a recent global trend toward legalizing eCall that transmits relevant information through wireless communication for emergency services in a vehicle, and Era-glonass which is an emergency situation management system in a vehicle. Accordingly, mounting a telematics device in a vehicle is required.

Meanwhile, when an engine of the vehicle is turned off, the telematics device enters a reception standby state. In this case, a remote user may control the vehicle or receive event information from the vehicle by using the telematics device in the vehicle. To this end, a communication modem included in the telematics device enters a reception standby mode in which the communication modem wakes up periodically.

In general, the time for which the telematics device is kept in a reception standby state varies depending on the charge of a battery connected to the telematics device, and the maximum duration of the reception standby state is predetermined. However, in many cases, the battery connected to the telematics device may be discharged faster than a preset time due to an increase in power consumption caused by a weak electric field, an inter-band movement, a handover between heterogeneous networks, a change in service status, and the like.

DISCLOSURE

Technical Problem

The present invention is directed to providing a communication modem included in a telematics device and a method of generating a control message therefor.

Technical Solution

One aspect of the present invention provides a communication module in a vehicle, including: a battery unit; a receiving unit set to receive power from the battery unit and operate on a predetermined cycle in a reception standby state; and a control unit set to cumulatively calculate an amount of a consumed current according to an operation time of the receiving unit, and when a value of the cumulative calculation exceeds a predetermined value, generate a control message for controlling an operation cycle of the receiving unit or controlling the communication module to be turned off.

The communication module may further include a transmitting unit set to receive the power from the battery of the vehicle, and the control unit may be set to generate the control message by further cumulatively calculating an amount of a consumed current according to an operation time of the transmitting unit in the reception standby state.

The control unit may be set to have the operation time of the receiving unit and the operation time of the transmitting unit assigned a first weight and a second weight that are different from each other, respectively.

The control unit may be set to, when a cumulative value of a summation of an amount of the consumed power according to the operation time of the receiving unit reflecting the first weight and an amount of the consumed power according to the operation time of the transmitting unit reflecting the second weight exceeds a predetermined value, generate a control message for controlling the communication module to be turned off.

Another aspect of the present invention provides a method of generating a control message for a communication module in a vehicle, the method including: cumulatively calculating an amount of a consumed current according to an operation time of a receiving unit that operates on a predetermined cycle in a reception standby state; comparing a value obtained in the cumulative calculation with a predetermined value; and when the value of the cumulative calculation exceeds the predetermined value, generating a control message for controlling an operation cycle of the receiving unit or controlling the communication module to be turned off.

In the cumulative calculation, an operation time of a transmitting unit in the reception standby state may be further calculated in a cumulative manner.

In the cumulative calculation, an amount of the consumed current according to the operation time of the receiving unit and an amount of a consumed current according to the operation time of the transmitting unit may be assigned a first weight and a second weight that are different from each other, respectively.

In the generating of the control message, a control message for controlling the communication module to be turned off is generated when a cumulative value of a summation of the amount of the consumed current according to the operation time of the receiving unit reflecting the first weight and the amount of the consumed current according to the operation time of the transmitting unit reflecting the second weight exceeds a predetermined value.

Advantageous Effects

According to the embodiments of the present invention, it is possible to prevent the discharge of a battery connected to a telematics device in the reception standby state. Particularly, it is possible to prevent discharge of a battery connected to a telematics device even in an environment where power consumption is higher than normal due to due to a weak electric field, an inter-band movement, a handover between mobile networks, a change in service status, and the like.

DESCRIPTION OF DRAWINGS

FIG. 5 shows an example in which values of consumed currents according to an operation time of a receiving unit and an operation time of a transmitting unit in a reception standby state are cumulatively calculated.

MODES OF THE INVENTION

Figure 1:
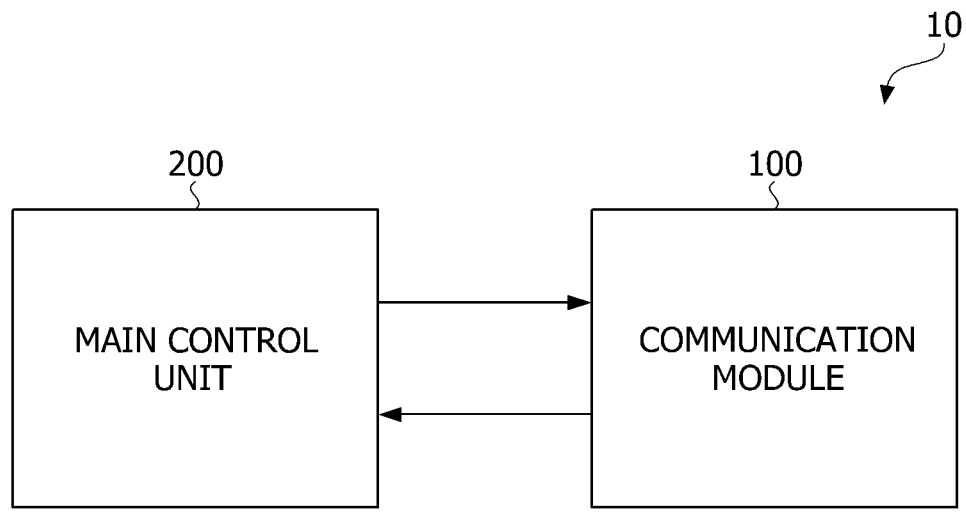
FIG. 1 is a block diagram illustrating a telematics device according to an embodiment of the present invention.

While the invention is susceptible to various modifications and alternative forms, specific embodiments thereof are shown by way of example in the drawings and will herein be described in detail. However, it should be understood that there is no intent to limit the invention to the specific embodiments, rather the invention is to cover all modifications, equivalents, and alternatives falling within the spirit and scope of the invention. It should be understood that, although the terms "first," "second," etc. may be used herein to describe various elements, these elements are not limited by these terms. These terms are only used to distinguish one element from another. For example, a first element could be termed a second element, and, similarly, a second element could also be termed a first element, without departing from the scope of the present invention. As used herein, the term "and/or" includes any one or combinations of the associated listed items.

It should be understood that when an element is referred to as being "connected" or "coupled" to another element, the element can be directly connected or coupled to another element or intervening elements may be present. Conversely, when an element is referred to as being "directly connected" or "directly coupled" to another element, there are no intervening elements present. Other words used to describe a relationship between elements should be interpreted in a like fashion (i.e., "between" versus "directly between," "adjacent" versus "directly adjacent," etc.).

The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present invention will be described with reference to the accompanying drawings in detail. For better understanding of the present invention, the same reference numerals are used to refer to the same elements through the description of the figures, and the description of the same elements will be omitted.

FIG. 1 is a block diagram illustrating a telematics device according to an embodiment of the present invention.

Referring to FIG. 1, a telematics device 10 includes a communication module 100 and a main controller 200. The communication module 100 remotely communicates with a telematics server. Accordingly, remote control, remote diagnosis, and the like may be performed.

The main controller 200 is connected to the communication module 100 and performs overall control of the telematics device 10. The main controller 200 and the communication module 100 may be connected to each other in a wired or wireless manner.

Although not shown, the telematics device 10 may further include a diagnosis manager for diagnosing a state of a vehicle, a storage unit for storing diagnostic information of the vehicle, and a display unit for displaying the diagnostic information of the vehicle.

Figure 2:
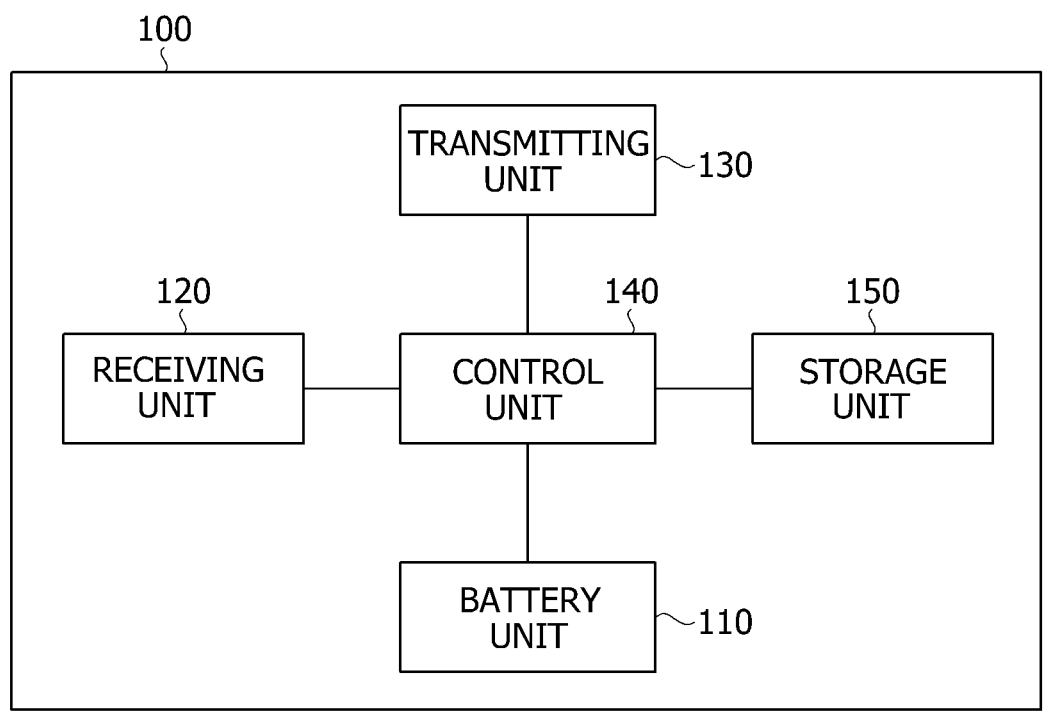
FIG. 2 is a block diagram illustrating a communication module (100) according to an embodiment of the present invention.

FIG. 2 is a block diagram illustrating the communication module 100 according to the embodiment of the present invention.

Referring to FIG. 2, the communication module 100 includes a battery unit 110, a receiving unit 120, a transmitting unit 130, a control unit 140, and a storage unit 150.

The battery unit 110 stores electric power for being supplied to the communication module 100. The battery unit 110 may supply power to the communication module 100 when an engine of the vehicle is turned off or the communication module 100 may not receive power from the vehicle.

Figure 3:
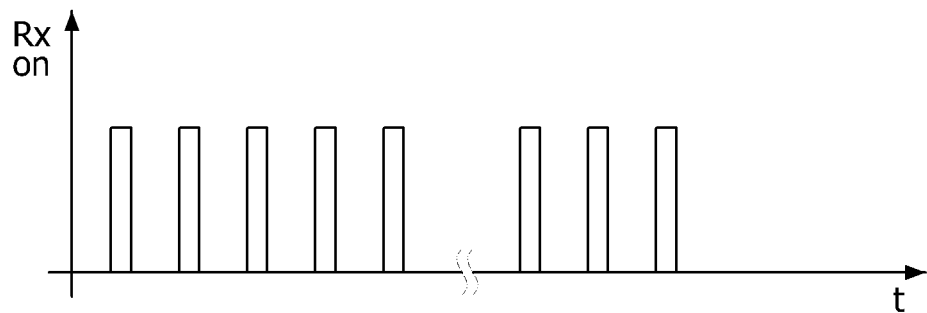
FIG. 3 shows an example in which a receiving unit (120) periodically wakes up in a reception standby state.

The receiving unit 120 and the transmitting unit 130 receive signals from a base station (not shown) and transmit signals to the base station. Meanwhile, when the engine of the vehicle is turned off, the communication module 100 enters a reception standby state. In the reception standby state, the receiving unit 120 receives power from the battery unit 110 and periodically wakes up. FIG. 3 shows an example in which the receiving unit 120 periodically wakes up in a reception standby state. The receiving unit 120 may identify a paging signal from the base station through the periodic wake-up process. In addition, in the reception standby state, the transmitting unit 130 also receives the power from the battery unit 110 and wakes up. In this case, the transmitting unit 130 may wake up periodically or when an event occurs. For example, in a reception standby state, the transmitting unit 130 may wake up when the receiving unit 120 receives a paging signal from the base station. As another example, in the reception standby state, the transmitting unit 130 may wake up when there is a signal to be transmitted by the transmitting unit. As another example, in the reception standby state, the transmitting unit 130 may be set to wake up together with the receiving unit 120.

In addition, the control unit 140 performs overall control of the communication module 100. In particular, the control unit 140 is set to, when the communication module 100 is in a reception standby state, cumulatively calculate the amounts of consumed currents according to an operation time of the receiving unit 120 and an operation time of the transmitting unit 130, and generate a control message for controlling an operation cycle of the receiving unit 120 or controlling the communication module 100 to be turned off in a case when a value of the cumulative calculation exceeds a predetermined value.

The storage unit 150 stores all programs required for the communication module 100 to operate. In particular, the storage unit 150 may be configured to store an operation cycle of the receiving unit 120 in a reception standby state, an amount of the consumed current according to the operation time of the receiving unit 120, and a program required for the control unit 140 to cumulatively calculate the amounts of the consumed current according to the operation time of the receiving unit 120 and the amounts of the consumed current according to the operation time of the transmitting unit 130.

Figure 4:
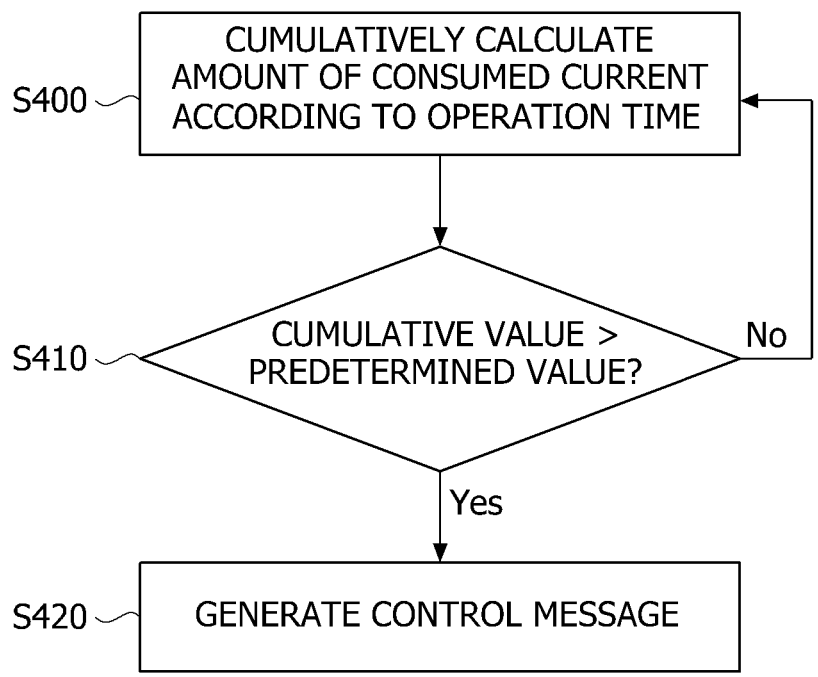
FIG. 4 is a flowchart showing a method of generating a control message of a communication module in a telematics device according to an embodiment of the present invention.

FIG. 4 is a flowchart showing a method of generating a control message of a communication module in a telematics device according to an embodiment of the present invention.

Referring to 4, the control unit 140 of the communication module 100 cumulatively calculates an amount of a consumed current according to an operation time of the receiving unit 120 and an amount of a consumed current according to an operation time of the transmitting unit 130 in a reception standby state (S400). Here, the amount of the consumed current according to the operation time of the receiving unit 120 may include an amount of a consumed current according to a time for which the receiving unit 120 periodically wakes up in a reception standby state as shown in FIG. 3. The amount of the consumed current according to the operation time of the receiving unit 120 may further include an amount of a consumed current according to a time for which the receiving unit 120 performs an operation of receiving a signal while being kept in a wake-up state. The amount of the consumed current according to the operation time of the transmitting unit 130 may include an amount of a consumed current according to a time for which the transmitting unit 130 periodically wakes up in a reception standby state. The amount of the consumed current according to the operation time of the transmitting unit 130 may further include an amount of a consumed current according to a time for which the transmitting unit 130 performs an operation of transmitting a signal while being kept in a wake-up state. FIG. 5 shows an example in which the amounts of the consumed currents according to the operation time of the receiving unit 120 and the operation time of the transmitting unit 130 in the reception standby state are cumulatively calculated. Here, rx_on and rx_off (time=) indicate the operation time of the receiving unit 120, lte_tx_on and lte_tx_off (time=) indicate the operation time of the transmitting unit 130, and cnt indicates a cumulative value obtained by sequentially accumulating the amount of the consumed current according to the operation time of the receiving unit 120, and the amount of the consumed current according to the operation time of the transmitting unit 130.

The control unit 140 of the communication module 100 compares the cumulative value calculated in operation S400 with a predetermined value (S410), and when the cumulative value exceeds the predetermined value, generates a control message for controlling the operation cycle of the receiving unit 120 or controlling the communication module 100 to be turned off (S420).

For example, it is assumed that the communication module 100 has specifications in which a reception standby state is maintained for 96 hours at an average of 2 mA. The total amount of a current allocated to the communication module 100 with the specifications is 2 mA×96 h=192 mAh. Referring to FIG. 3, when the communication module 100 operates normally in a reception standby state, and an amount of a current consumed in a single wake-up of the receiving unit 120 is 0.124 µAh, a maximum number of times of wake-ups of the receiving unit 120 is 192 mAh/0.124 µAh, that is, about 1,548,000 times, and when 96 hours have elapsed, the communication module 100 is turned off. However, when the operation time of the receiving unit 120 and the transmitting unit 130 is increased due to a weak electric field, an inter-band movement, a handover between mobile networks, a change in service status, and the like, the control unit 140 may calculate a cumulative value of the amounts of the consumed current according to the operation time. When the cumulative value exceeds a predetermined value, the control unit 140 may generate a control message even before 96 hours have elapsed since the start of the reception standby. Here, the control message may be a message for controlling the wake-up cycle of the receiving unit 120. For example, the control message may be a control message for lengthening the wake-up cycle of the receiving unit 120. Accordingly, the time for which the communication module 100 is kept in a reception standby state may be increased. As another example, the control message may be a control message for terminating the communication module 100 early before a preset amount of time (e.g., 96 hours) elapses. The control message generated by the control unit 140 is transmitted to the main controller 200, and the main controller 200 changes the wake-up cycle of the communication module 100 or performs an early termination of the communication module 100 according to the control message.

Meanwhile, the amount of the current consumed during the operation time of the receiving unit 120 and the amount of the current consumed during the operation time of the transmitting unit 130 may be different from each other. Accordingly, the control unit 140 may assign different weights to the operation time of the receiving unit 120 and the operation time of the transmitting unit 130 to calculate a cumulative value.

Figure 6:
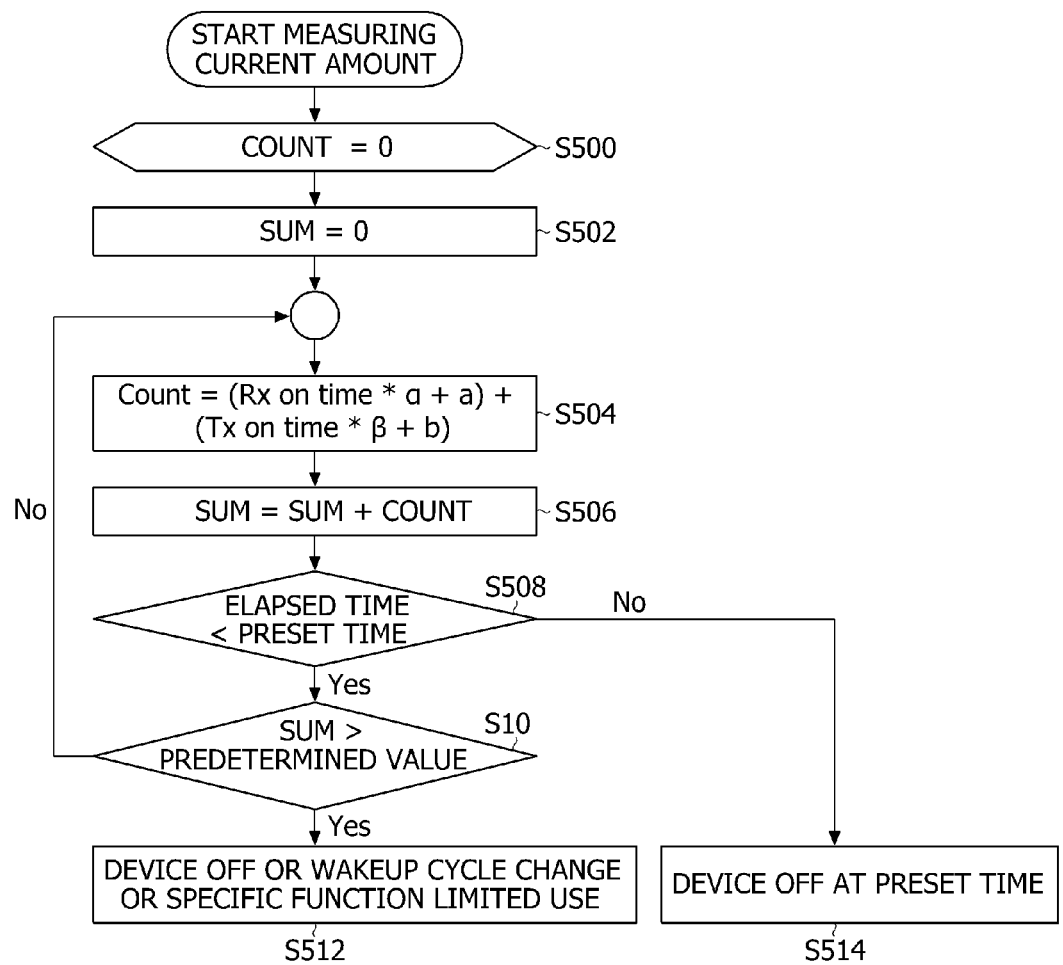
FIG. 6 is a flowchart showing a detailed method of generating a control message using a weight by a communication module in a telematics device according to an embodiment of the present invention

FIG. 6 is a flowchart showing a detailed method of generating a control message using a weight by a communication module in a telematics device according to an embodiment of the present invention. The following description illustrates an example in which a communication module in a telematics device enters a reception standby state because the engine of the vehicle is stopped.

Referring to FIG. 6, count values of the amounts of the consumed current according to the operation time of the receiving unit 120 and the operation time of the transmitting unit 130 and a cumulative value thereof are initially set to 0 (S500 and S502).

In a reception standby state, the control unit 140 of the communication module 100 summates a count value reflecting a first weight assigned to the operation time of the receiving unit 120 and a count value reflecting a second weight assigned to the operation time of the transmitting unit 130 (S504), and cumulatively calculates the summed count values (S506). Here, the term "Rx on time" denotes the operation time of the receiving unit, the term "Tx on time" denotes the operation time of the transmitting unit, α denotes the first weight, β denotes the second weight, and a and b are constants. α and β may be set to have a different value according to an electric field, an inter-band movement, a handover between heterogeneous networks, and a change in service status.

The control unit 140 of the communication module 100 compares an elapsed time since the start of the reception standby state with a preset time (e.g., 96 hours) (S508), and when the elapsed time is less than the preset time, compares the cumulative value obtained in operation S506 with a predetermined value (S510). The control unit 140 generates a control message for turning off the communication module 100, setting a wake-up cycle to be longer, or limiting the use of a particular function of the communication module 100 when the cumulative value is larger than the predetermined value (S512). On the other hand, when the cumulative value is not larger than the predetermined value, the control unit 140 repeats the operation S504 and the subsequent operations.

On the other hand, when it is determined in operation S508 that the elapsed time since the start of the reception standby state exceeds the preset time (e.g., 96 hours), the control unit 140 may generate a control message for immediately turning off the communication module 100 (S514).

Table 1 shows an example in which weights are set to have different values according to the electric field.

TABLE 1

| Mode | Cell power (dBm) | | | Operation time of receiving unit | Count value |
|---|---|---|---|---|---|
| WCDMA | Strong/ intermediate electric field | RSCP | >−110 | 4~5 ms | 10 |
| | Weak electric field 1 | RSCP | =−120 | 10~12 ms | 13 |
| | Weak electric field 2 | RSCP | <−120 | 45~51 ms | 35 |
| LTE | Strong/ intermediate electric field | RSRP | >−132 | 5~10 ms | 13 |
| | Weak electric field | RSRP | <−133 | 16 ms | 20 |

Referring to Table 1, when the communication module 100 uses wideband code division multiple access (WCDMA), in the case when the operation time of the receiving unit in the strong/intermediate electric field is in a range of 4 to 5 ms, the count value reflecting a weight according to the electric field may be calculated as 10, in the case when the operation time of the receiving unit in the weak electric field 1 is in a range of 10 to 12 ms, the count value reflecting a weight according to the electric field may be calculated as 13, and in the case when the operation time of the receiving unit in the weak electric field 2 is in a range of 45 to 51 ms, the count value reflecting a weight according to the electric field may be calculated as 35.

Similarly, when the communication module 100 uses Long-Term Evolution (LTE), in the case when the operation time of the receiving unit in the strong/intermediate electric field is in a range of 5 to 10 ms, the count value reflecting a weight according to the electric field may be calculated as 13, and in the case when the operation time of the receiving unit in the weak electric field is 16 ms, the count value reflecting a weight according to the electric field may be calculated as 20. In addition, an equation may be used rather than using the weight value table as shown in Table 1.

Although Table 1 illustrates an example in which the weights are set to vary according to only the electric field, the present invention is not limited thereto. For example, the weights may be set to vary according to an inter-band movement, a handover between heterogeneous networks, and a change in service status.

As described above, according to the embodiment of the present invention, the control unit 140 of the communication module 100 controls the communication module 100 by monitoring the amount of the current consumed by the telematics device 10 in the reception standby state, so that the battery unit 110 is prevented from being discharged without having to add an additional component.

Although the above description is made in relation to the communication module 100 that generates a control message and transmits the generated control message to the main controller 200, the present invention is not limited thereto. For example, the communication module 100 may control the turn-off or the operation cycle of the communication module 100 by itself.

Although the present invention has been described with reference to the exemplary embodiments, it should be understood by those of skilled in the art that changes and modifications are possible without departing from the scope and sprit of the disclosure.

| [Reference Numerals] |
|---|
| 10: telematics device |
| 100: communication module |
| 200: main controller |
| 110: battery unit |
| 120: receiving unit |
| 130: transmitting unit |
| 140: control unit |
| 150: storage unit |

The invention claimed is:

1. A communication device in a vehicle, comprising:
a receiver configured to receive power from a battery of the vehicle and operate on a predetermined cycle in a reception standby state; and
a controller configured to:
generate a plurality of count values corresponding to the receiver being cycled on and off, each of the plurality of count values being based on an operation time of the receiver multiplied by a first weight,
sum the plurality of count values to generate a summation result, and
in response to the summation result exceeding a predetermined value, adjust an operation cycle of the receiver or terminate operation of the communication device,
wherein the first weight is variable based on a power level of an electric field and an amount of operating time,
wherein the first weight is set to a low weight value when the receiver operates for a first predetermined amount of operating time at an electric field power level that is greater than a first value, and the first weight is set to a high weight value when the receiver operates for a second predetermined amount of operating time at an electric field power level that is less than the first value, and
wherein the high weight value is greater than the low weight value.

2. The communication device of claim 1, wherein the plurality of count values are based on an amount of current consumed by the receiver.

3. The communication device of claim 1, wherein the first weight is variable based on at least one of an inter-band movement, a handover between heterogeneous networks, and a change in service status.

4. The communication device of claim 1, wherein the predetermined value is a maximum operation count value corresponding to a current amount allocated to the communication device.

5. The communication device of claim 1, wherein the controller is further configured to generate a control message for turning off the communication device.

6. The communication device of claim 5, wherein the control message includes a control message for early termination of the communication device before a preset reception standby time.

7. The communication device of claim 1, wherein the second predetermined amount of operating time is set to a longer amount of time than the first predetermined amount of operating time.

8. The communication device of claim 1, wherein the first and second predetermined amount of operating times and the low and high weight values are set differently based on a type of wireless communication standard being used by the communication device.

9. A communication device in a vehicle, comprising:
a receiver configured to receive power from a battery of the vehicle, and operate on a predetermined cycle in a reception standby state;
a transmitter configured to receive the power from the battery of the vehicle; and
a controller configured to:
generate a plurality of count values corresponding to the receiver being cycled on and off and the transmitter being cycled on and off, each of the plurality of count values being based on an operation time of the receiver multiplied by a first weight and an operation time of the transmitter multiplied by a second weight, the first weight being different than the second weight,
sum the plurality of count values to generate a summation result, and
in response to the summation result exceeding a predetermined value, adjust at least one of an operation cycle of the receiver and an operation cycle of the transmitter or terminate operation of the communication device,
wherein the first weight is variable based on a power level of an electric field and an amount of operating time,
wherein the first weight is set to a low weight value when the receiver operates for a first predetermined amount of operating time at an electric field power level that is greater than a first value, and the first weight is set to a high weight value when the receiver operates for a second predetermined amount of operating time at an electric field power level that is less than the first value, and
wherein the high weight value is greater than the low weight value.

10. The communication device of claim 9, wherein the plurality of count values are based on an amount of consumed current according to the operation time of the receiver and an amount of consumed current according to the operation time of the transmitter.

11. The communication device of claim 9, wherein the second predetermined amount of operating time is set to a longer amount of time than the first predetermined amount of operating time.

12. A method of controlling a communication device in a vehicle, the method comprising:
operating a receiver in the communication device on a predetermined cycle in a reception standby state while the receiver receives power from a battery of the vehicle;
generating a plurality of count values corresponding to the receiver being cycled on and off, each of the plurality of count values being based on an operation time of the receiver multiplied by a first weight;
summing the plurality of count values to generate a summation result, and
in response to the summation result exceeding a predetermined value, adjusting an operation cycle of the receiver or terminating operation of the communication device,
wherein the first weight is variable based on a power level of an electric field and an amount of operating time,
wherein the first weight is set to a low weight value when the receiver operates for a first predetermined amount of operating time at an electric field power level that is greater than a first value, and the first weight is set to a high weight value when the receiver operates for a second predetermined amount of operating time at an electric field power level that is less than the first value, and
wherein the high weight value is greater than the low weight value.

13. The method of claim 12, wherein the first weight is variable based on at least one of an inter-band movement, a handover between heterogeneous networks, and a change in service status.

14. The method of claim 12, wherein the predetermined value is a maximum operation count value corresponding to a current amount allocated to the communication device.

15. The method of claim 12, wherein each of the plurality of count values is based on the operation time of the receiver multiplied by the first weight and an operation time of a transmitter in the communication device in a standby state while the transmitter receives the power from the battery of the vehicle.

16. The method of claim 15, wherein each of the plurality of count values is based on the operation time of the receiver multiplied by the first weight and the operation time of the transmitter multiplied by a second weight.

17. The method of claim 16, wherein the first weight is different from the second weight.

18. The method of claim 12, further comprising:
triggering a reception standby timer when the communication device enters the reception standby state; and
generating a control message for controlling the communication device to be turned off when the reception standby timer expires.

19. The method of claim 12, wherein the second predetermined amount of operating time is set to a longer amount of time than the first predetermined amount of operating time.

* * * * *